US008391566B2

(12) United States Patent  
Cottard

(10) Patent No.: US 8,391,566 B2
(45) Date of Patent: Mar. 5, 2013

(54) METHOD OF IDENTIFYING A PERSON BY HIS IRIS

(75) Inventor: Martin Cottard, Paris (FR)

(73) Assignee: Morpho, Paris (FR)

( * ) Notice: Subject to any disclaimer, the term of this patent is extended or adjusted under 35 U.S.C. 154(b) by 367 days.

(21) Appl. No.: 12/744,009

(22) PCT Filed: Nov. 12, 2008

(86) PCT No.: PCT/EP2008/065410
§ 371 (c)(1),
(2), (4) Date: May 20, 2010

(87) PCT Pub. No.: WO2009/065760
PCT Pub. Date: May 28, 2009

(65) Prior Publication Data
US 2010/0246903 A1    Sep. 30, 2010

(30) Foreign Application Priority Data
Nov. 22, 2007 (FR) ...................................... 07 08186

(51) Int. Cl.
*G06K 9/00* (2006.01)
(52) U.S. Cl. .................... 382/117; 382/118; 382/114
(58) Field of Classification Search .................. 382/114, 382/117, 118
See application file for complete search history.

(56) References Cited

U.S. PATENT DOCUMENTS

| | | | | |
|---|---|---|---|---|
| 5,291,560 A | * | 3/1994 | Daugman ...................... | 382/117 |
| 6,144,754 A | * | 11/2000 | Okano et al. .................. | 382/117 |
| 7,146,027 B2 | * | 12/2006 | Kim et al. ...................... | 382/117 |
| 7,309,126 B2 | * | 12/2007 | Mihashi et al. ................ | 351/205 |
| 7,444,017 B2 | * | 10/2008 | Gallagher ....................... | 382/167 |
| 7,583,823 B2 | * | 9/2009 | Jones et al. ..................... | 382/117 |
| 7,796,784 B2 | * | 9/2010 | Kondo et al. .................. | 382/117 |
| 7,869,626 B2 | * | 1/2011 | Ko et al. ........................ | 382/117 |
| 8,098,901 B2 | * | 1/2012 | Hamza .......................... | 382/117 |
| 2002/0131623 A1 | * | 9/2002 | Musgrave et al. ............. | 382/117 |
| 2007/0211924 A1 | | 9/2007 | Hamza | |

FOREIGN PATENT DOCUMENTS

EP    1 600 898 A2    11/2005

OTHER PUBLICATIONS

Topi Maenpaa "An Interative Algorithm for Fast Iris Detection" IWBRS 2005, pp. 127-134, 2005.*
Jose Luis Gil Rodriguez et al.; "A New Method for Iris Pupil Contour Delimitation and Its Application in Iris Texture Parameter Estimation" Progress in Pattern Recognition, Image Analysis and Applications Lecture Notes in Computer Science; LNCS, Springer-Verlag, BE, vol. 3773, Jan. 1, 2005; pp. 631-641.

* cited by examiner

*Primary Examiner* — Bhavesh Mehta
*Assistant Examiner* — Utpal Shah
(74) *Attorney, Agent, or Firm* — Gerald E. Helget; Briggs and Morgan, P.A.

(57) ABSTRACT

A method of identifying a person by his iris through determining an interior limit and using a predefined exterior limit to form an analysis zone. A code associated with the analysis zone is generated and compared with a previously generated reference code. If there is no match another predefined exterior limit is used. The process repeats as long as predefined exterior limits exist or until a positive match is made.

13 Claims, 2 Drawing Sheets

METHOD OF IDENTIFYING A PERSON BY HIS IRIS

CROSS REFERENCE TO RELATED APPLICATIONS

The present application is based on and claims priority to International Application PCT/EP2008/065410 filed on Nov. 12, 2008 and French Patent Application No. 07/08186 filed on Nov. 22, 2007, the contents of which are hereby incorporated by reference in their entirety.

BACKGROUND OF THE INVENTION

The present invention concerns a method of identifying a person, and an identification device implementing such an identification method. It finds an application in the field of biometric recognition and in particular in the field of identification by analysis of the irises of the eyes.

Identification by biometric recognition is used for protecting installations such as for example buildings or machines or for obtaining the granting of rights, such as for example the issue of an identity card, the payment of a pension, etc. This technology makes it possible to dispense with access codes or cards, which may be stolen or falsified. Use of this technology reinforces security since the probability that two persons have two identical biometrics is almost zero.

An eye comprises, from the center towards the periphery, the pupil, the iris and the sclerotic.

Identification by biometric recognition is more particularly based on analysis of the iris.

The document EP-A-0 661 037 discloses a method of identifying a person by his iris that comprises the steps of:
capturing an image of an eye to be identified,
determining an interior limit between the pupil and the iris from the said image,
determining an exterior limit between the iris and the sclerotic from the said image,
defining at least one analysis band between the internal limit and the external limit, the radial width of a band being defined as a fixed fraction of the radial width of the iris,
analysing each analysis band,
generating a present code associated with each analysis,
comparing the present code with a reference code,
measuring the resemblance between the present code and the reference code, and
making a decision concerning the identity of the person from the result of the measurement.

The identification method is implemented through the establishment of a system of polar coordinates.

Such an identification method has the disadvantage of making it necessary to determine the limit between the iris and the sclerotic. However, this limit is very difficult to determine for various reasons, such as for example the fuzziness of the boundary area.

In addition, such an identification method requires very lengthy calculation times to enable good determination of the limit between the iris and the sclerotic and to determine the various analysis bands. These calculation times are incurred for each identification attempt whether or not the iris to be identified is included in the data base.

For example, in the document entitled "Recognising Persons by their Iris Patterns" written by John Daugman, it is stated that the identification method used is divided up according to the time scheme:
Location of the eye and iris: 408 milliseconds,
Adjustment of the boundary of the pupil: 76 milliseconds,
Detection and adjustment of the eyelids: 93 milliseconds,
Demodulation and creation of the code: 102 milliseconds,
Comparison of two codes: 10 microseconds.

This scheme shows clearly that the location of the eye and iris and the adjustment of the boundary of the pupil are lengthy steps that must be reduced in order to reduce the time necessary for identification.

BRIEF SUMMARY OF THE INVENTION

One object of the present invention is to propose an identification method that does not have the drawbacks of the prior art and in particular limits the calculation time when the iris to be identified is clearly not included in the data base.

To this end, there is proposed a method of identifying a person by his iris, the identification method comprising the steps of:
capturing an image of an eye to be identified,
determining the interior limit of the iris from the said image,
placing a predefined exterior limit on the said image,
analysing, for said exterior limit, the area of the image lying between the interior limit and the said exterior limit,
generating a current code associated with the said analysis,
comparing the current code with a previously generated reference code,
measuring the resemblance between the current code and the reference code from the comparison, and
making a decision concerning the identity of the person from the result of the measurement, and
looping back to the placing step, with another predefined exterior limit, as long as there exist different predefined exterior limits or as long as the decision taking step is not positive.

Advantageously, the exterior limit is predefined from elements external to the captured image.

Advantageously, each exterior limit is a closed curve.

Advantageously, when there are several closed curves, they define surfaces included in one another.

Advantageously, each exterior limit is predefined at the time of recording of the reference code.

Advantageously, each positive comparison of a distinctive element of the reference code with the current code increments a score by a first value, and each negative comparison of a distinctive element of the reference code with the current code decrements the score by a second value.

Advantageously, the first value is equal to or greater than the second value.

The invention also proposes a device for identifying a person by his iris, the identification device comprising:
means of capturing an image of an eye to be identified,
means of determining an interior limit of the iris from the said image,
means of placing a predefined exterior limit on said image,
analysis means which, for the exterior limit, are designed to analyse the area of the image lying between the interior limit and the said exterior limit,
means of generating a current code associated with the said analysis,
means of comparing the current code with a previously generated reference code,
means of measuring the resemblance between the current code and the reference code from the comparison, and
means of making a decision concerning the identity of the person from the result of the measurement, and means of looping back that are designed to choose another predefined exterior limit, as long as there exist different predefined exterior limits or as long as the decision taking means have not delivered a positive decision.

BRIEF DESCRIPTION OF THE DRAWINGS

The features of the invention mentioned above, as well as others, will emerge more clearly from a reading of the following description of an example embodiment, the said description being given in relation to the accompanying drawings, among which.

DETAILED DESCRIPTION OF THE INVENTION

Figure 2:
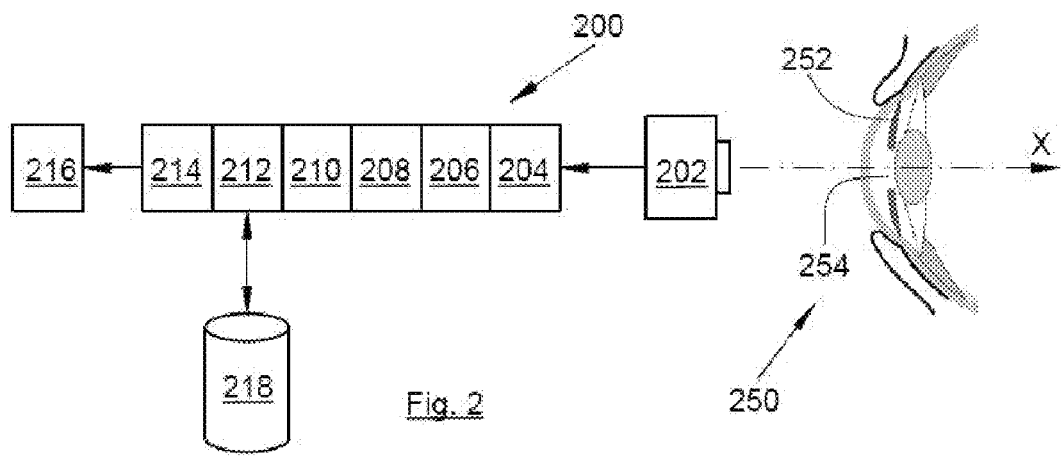
FIG. 2 shows an identification device according to the invention.

FIG. 2 shows an identification device 200 according to the invention that is disposed opposite an eye 250 to be identified.

The eye 250 comprises a pupil 254 and an iris 252 surrounded by a sclerotic.

Figure 3:
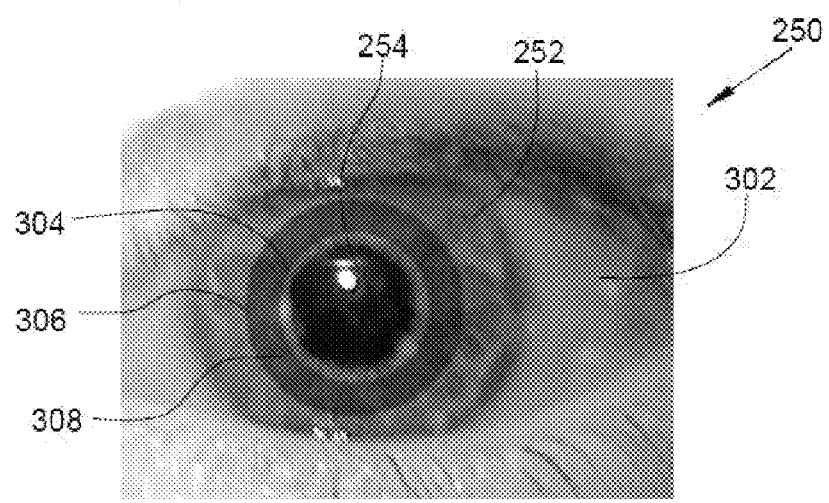
FIG. 3 shows the image of an iris captured by the identification device according to the invention.

FIG. 3 shows an image of the eye 250 to be identified, captured by the identification device 200.

Figure 1:
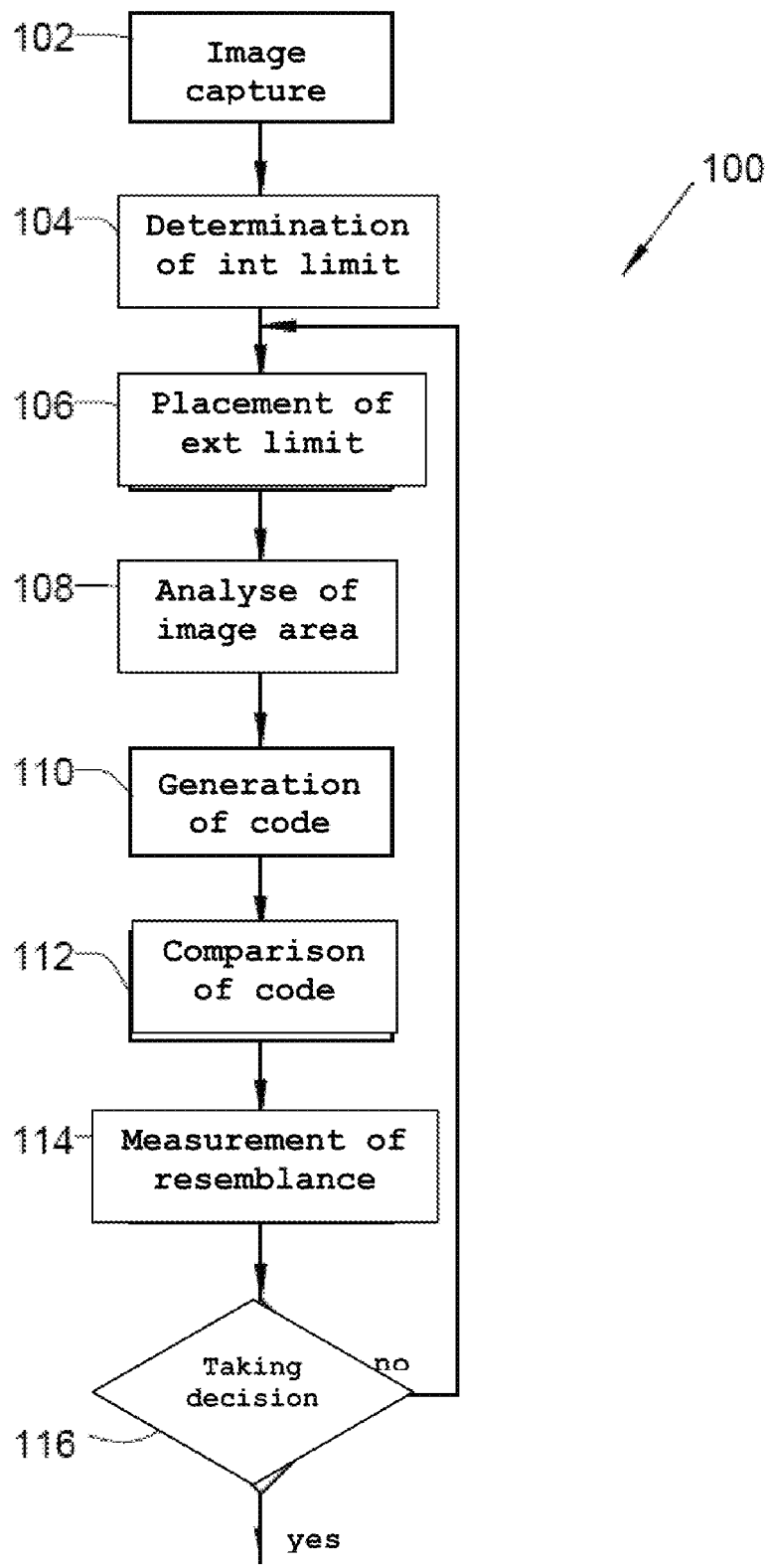
FIG. 1 shows an algorithm of an identification method according to the invention.

FIG. 1 shows a method 100 of identifying a person by his iris 252 that comprises:
a step of capturing an image 102 of an eye 250 to be identified,
a step 104 of determining the interior limit 304 of the iris 252 from the said image,
a step 106 of placing a predefined exterior limit 306 on the said image,
a step 108 of analysing, for said exterior limit 306, the area 308 of the image lying between the interior limit 304 and the said exterior limit 306,
a step 110 of generating a current code associated with the said analysis,
a step 112 of comparing the current code with a previously generated reference code,
a step 114 of measuring the resemblance between the current code and the reference code from the comparison, and
step 116 of making a decision concerning the identity of the person from the result of the measurement, and
looping back onto the placing step 106, with another predefined exterior limit 306, as long as there exist different predefined exterior limits 306 or as long as the decision taking step 116 is not positive.

The identification device 200 comprises:
means 202 of capturing an image of an eye 250 to be identified,
means 204 of determining the interior limit 304 of the iris 252 from the said image,
means 206 of placing each predefined exterior limit 306 on said image,
analysis means 208 which, for the exterior boundary 306, are designed to analyze the area 308 of the image lying between the interior boundary and the said exterior boundary 306,
means 210 of generating the current code associated with each analysis,
means 212 of comparing the current code with a previously generated reference code 218 stored in a database 218,
means 214 of measuring the resemblance between the current code and the reference code from the comparison, and
means 216 of making a decision concerning the identity of the person from the result of the measurement.

The predefined exterior limit 306 does not relate to the limit between the iris 252 and the sclerotic. The calculation time for the exterior limit between the iris 252 and the sclerotic therefore does not exist, unlike the identification method of the prior art. In the same way the analysis bands, as defined in the identification method of the prior art, do not exist in the method according to the invention. Use of such as method reduces by approximately 50% the time that, in the prior art, is necessary for the location of the eye and of the iris and the adjustment of the boundary of the pupil.

The predefined exterior boundary 306 is predefined from elements external to the captured image. The absence of the determination of the boundary between the iris 252 and the sclerotic avoids problems of uncertainty relating to such determination and the calculation time necessary for determination thereof. The predefinition may be a set of one or more closed curves (circles, ellipses or other). This set is chosen and applied whatever the result of the step 104 of determining the interior limit 304. The set can consist of curves that have been applied during the recording of the reference code of the various persons in the database 218.

The capture 102 is implemented by the capture means 202, which may for example be of the CCD sensor type.

The determination step 104 implemented by the determination means 204 may be based on the fact that the brightness of the pupil 254 and the brightness of the iris 252 are greatly different. The determination of the interior limit is then based on the curve for the abrupt change in brightness on the image.

In the context of the invention as shown in the figures, each exterior limit 306 and each interior limit 304 take the form of a circle, but in general terms any closed curve may be used. The closed curves define surfaces included in one another.

Each exterior limit 306 may be a closed curve with a predefined form, for example a circle with a given radius and with its center as the center of the interior limit 304 if the latter is determined, or an ellipse to avoid the exterior limit 306 excessively covering the eyelids 250, which are sources of uncertainty.

In the case of several exterior limits 306, each is different, for example in the case of circles each circle has a different radius.

For example, for each exterior limit 306, its radius "R" make be of the form "R=K×Rpupil", where K belongs to a predefined list of factors.

For example, for each exterior limit 306, its radius "R" may be of the form "R=R0+Rpupil", where R0 belongs to a predefined list.

For example, for each exterior limit 306, its radius "R" may be of the form "R=F(Rpupil)", where F belongs to a predefined set of several functions.

Figure 4A:
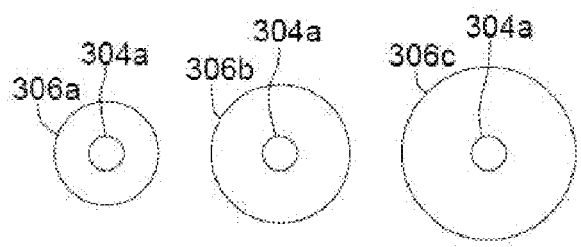
FIG. 4a and FIG. 4b show examples of analysis zones in the context of the identification method according to the invention.

FIG. 4a shows, for an eye the code of which is stored in the database 218, and interior limit 304a and three exterior limits 306a, 306b and 306c. The interior limit 304a corresponds to a specific opening of the pupil 254. From each pair consisting of the interior limit 304a and an exterior limit 306a, 306b, 306c, the zone lying between the interior limit 304a and the corresponding exterior limit 306a, 306b, 306b is analysed and coded by the analysis means 208 and the generation means 210 in accordance with the analyses and codings used in the identification methods of the prior art, such as for example the method described in the document EP-A-0 665 0037. Each code thus generated from each pair (304a, 306a), (304b, 306b), (304c, 306c) is stored in the database 218.

Figure 4B:
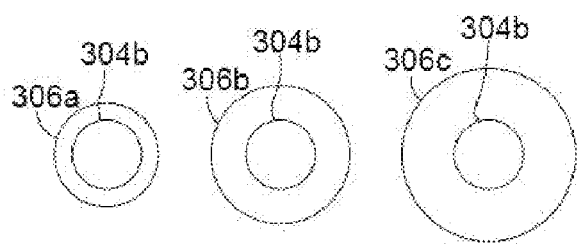

FIG. 4b shows, for the eye 250 to be identified, an interior limit 304b and the three exterior limits 306a, 306b and 306c. The exterior limits 306a, 306b, 306c are predefined in that they are the same as those used doing the recording of the reference codes in the database 218.

When the individual is being identified, he positions his eye 250 in front of the capture means 202, which trigger the capturing of an image.

The interior limit 304b is determined on the image (step 104).

A predefined exterior limit 306a, 306b, 306c is applied to the image (step 106).

The area included between the interior limit 304a and the exterior limit applied 306a, 306b, 306c is analysed (step 108) and coded in the form of a current code (step 110).

The code is then compared with each of the codes in the database 218 (step 112).

The resemblance is then measured (step 114) and the taking of the decision with regard to the identification of the person (step 116) is based on this measurement.

The method 100 the loops back onto the placing step 106. This looping takes place as long as there exists an exterior limit 306a, 306b, 306c different from those already put in place that has not been put in place or as long as the decision taking step 116 is not positive, that is to say as long as the person has not been identified.

For this purpose, the identification device 150 comprises looping means that are designed to choose another predefined exterior limit 306 as long as there exist different predefined exterior limits 306 or as long as the decision taking means 116 have not delivered a positive decision.

Between FIGS. 4a and 4b, the pupil has dilated between recording (FIG. 4a) and identification (FIG. 4b).

During the comparison, the code of the area between the dilated interior limit 304b and each exterior limit 306a, 306b, 306c is successively compared with the codes in the database 218, and in particular the codes issuing from the three images in FIG. 4a.

For each comparison, a measurement of the resemblance is made. If one of these measurements is above an acceptance threshold, the individual is considered to be recognised and the identification process 100 stops. If none of these measurements is above the acceptance threshold, the individual is considered to be not recognised and the following code is compared.

Although the database necessary for implementing the identification method according to the invention is larger than the database used in the case of the identification method of the prior art, the total duration of the identification method according to the invention remains less than the total duration of the method of the prior art since the time necessary for a comparison is very much less than the time saved during the previous steps. In addition, the size of the base and the comparison time have no importance if it is wished to verify the identity of a person who presents himself by name.

In this case, in the Figures, the radius ratio between:
the interior limit 304a and the exterior limit 306a is 2,
the interior limit 304a and the exterior limit 306b is 3,
the interior limit 304a and the exterior limit 306c is 4,
the interior limit 304b and the exterior limit 306a is 1,
the interior limit 304b and the exterior limit 306b is 2, and
the interior limit 304b and the exterior limit 306c is 3.

Because of these ratios, the code of the area between the dilated interior limit 304b and the exterior limit 306a is different from each of the codes generated from the examples in FIG. 4a.

The code of the area between the dilated interior limit 304b and the exterior limit 306b is close to the code of the area between the non-dilated interior limit 304a and the exterior limit 306a because they have the same ratio, that is to say, in other words, they contain the same portion of iris, this portion being compressed to a greater or lesser extent. The measurement of resemblance between the two codes is then above the threshold and the individual is considered to be identified.

By taking a plurality of exterior limits, the chances of having at least one of the configurations with a ratio close to those of the codes in the database 218 are increased. The number of exterior limits is not limited to three as in the example.

The placing means 206 that perform the placing step 106 thus successively position one of the exterior boundaries 306a, 306b, 306c on the captured image.

In addition, the identification method 100 of the invention makes it possible, for each pair of an interior limit and an exterior limit, to code the whole of the area 308 lying between the interior limit and the exterior limit in question. The iris 252 is then coded on each occasion between the interior limit and the exterior limit in question.

Unlike the identification method of the prior art that proceeds by dividing the area to be analysed into rings and analyses only each of the rings. The iris is then coded in pieces, that is to say between the interior limit and the exterior limit of each ring. Each area to be analysed is therefore part of the total area of the iris to be identified.

Naturally, in the case of the invention, each area 308 lying between the interior limit and the exterior limit in question can be divided into a plurality of rings for the purpose of analysis, but the global analysis of the said plurality of rings always relates to the area between the interior limit and the exterior limit in question.

The exterior limits are no longer limited to the boundary between the iris and sclerotic, but may be exterior to this boundary. It is then possible to find elements exterior to this boundary (for example in the sclerotic) that are found both in the codes in the database and in the current codes, thus participating in the comparison 112 and the measurement of the resemblance 114. Unlike the identification method of the prior art, in which only the elements that are within the exterior limit are taken into account at the risk of omitting them in the vicinity of the boundary.

The measurement of the resemblance may be the calculation of a score.

When a current code and a reference code are compared, each distinctive element (line, spot, etc) of the reference code that is identified in the current code gives a positive comparison and each distinctive element of the reference code that is not identified in the current code gives a negative comparison.

The score is incremented by a first value when the comparison is positive and decremented by a second value when the comparison is negative.

The first value may be equal to the second value or higher than the second value if a positive comparison is considered to be more relevant than a negative comparison.

When the score is higher than a given acceptance value, the identification of the person is accepted during the decision taking step 116, which returns a positive decision, if the score is lower the identification is rejected and the decision taking step 116 returns a negative decision and the placing means 206 then position another exterior limit 306a, 306b, 306c on the captured image as long as there exist different predefined exterior limits 306a, 306b, 306c or as long as the decision taking step 116 is not positive.

In another embodiment, it is possible to provide for the predefined exterior limit 306 to be predefined so that it is situated greatly within the exterior limit between the iris and the sclerotic. Thus the surface of the iris 252 that is analysed and coded is smaller than the surface of the iris that is coded in the identification method of the prior art. The code thus obtained is then shorter and the time necessary for executing the comparison step is reduced accordingly, affording an additional gain.

Naturally the present invention is not limited to the examples and embodiments described and depicted but is capable of numerous variants accessible to persons skilled in the art.

For example, provision is made for the identification method 100 to stop as soon as the decision taking step 116 is positive, but it is also possible to pursue the identification method 100 in order to verify that the person is not recorded several times in the database under different names.

The invention claimed is:

1. A method (100) of identifying a person by his iris (252), the identification method (100) comprising the steps of:
    (a) capturing (102) an image of an eye (250) to be identified;
    (b) determining (104) an interior limit (304) of the iris (252) from the said image;
    (c) placing (106) a predefined exterior limit (306) on said image, the exterior limit being predefined at the time of recording of a reference code;
    (d) analysing (108), for said exterior limit (306), the area (308) of the image lying between the interior limit (304) and the said exterior limit (306);
    (e) generating (110) a current code associated with the said analysis;
    (f) comparing (112) the current code with the previously generated reference code;
    (g) measuring (114) the resemblance between the current code and the reference code from the comparison;
    (h) making a decision (116) concerning the identity of the person from the result of the measurement; and
    (i) looping back to the placing step (106), with another predefined exterior limit (306), as long as there exist different predefined exterior limits (306) or as long as the decision taking step (116) is not positive.

2. The identification method (100) of claim 1, wherein each exterior limit (306) is a closed curve.

3. The identification method (100) of claim 2, wherein, when there are several closed curves (306), they define surfaces included in one another.

4. The identification method (100) of claim 1, wherein each positive comparison of a distinctive element of the reference code with the current code increments a score by a first value, and wherein each negative comparison of a distinctive element of the reference code with the current code decrements the score by a second value.

5. The identification method (100) of claim 4, wherein the first value is equal to or greater than the second value.

6. A device (150) for identifying a person by his iris (252), the identification device (150) comprising:
    (a) a means (202) of capturing an image of an eye (250) to be identified;
    (b) a means (204) of determining an interior limit (304) of the iris (252) from the said image;
    (c) a means (206) of placing a predefined exterior limit (306) on said image, the exterior limit being predefined at the time of recording of a reference code;
    (d) a means of analysis (208) which, for the exterior limit (306), is designed to analyse the area (308) of the image lying between the interior limit (304) and the said exterior limit (306);
    (e) a means (210) of generating a current code associated with the said analysis;
    (f) a means (212) of comparing the current code with the previously generated reference code stored in a database (218);
    (g) a means (214) of measuring the resemblance between the current code and the reference code from the comparison, and;
    (h) a means of making a decision (216) concerning the identity of the person from the result of the measurement; and
    (i) a means of looping back that is designed to choose another predefined exterior limit (306), as long as there exist different predefined exterior limits (306) or as long as the decision taking means (116) has not delivered a positive decision.

7. A method (100) of identifying a person by his iris (252), the identification method (100) comprising the steps of:
    (a) capturing (102) an image of an eye (250) to be identified;
    (b) determining (104) an interior limit (304) of the iris (252) from the said image;
    (c) placing (106) a predefined exterior limit (306) on said image;
    (d) analysing (108), for said exterior limit (306), the area (308) of the image lying between the interior limit (304) and the said exterior limit (306);
    (e) generating (110) a current code associated with the said analysis;
    (f) comparing (112) the current code with a previously generated reference code;
    (g) measuring (114) the resemblance between the current code and the reference code from the comparison, wherein each positive comparison of a distinctive element of the reference code with the current code increments a score by a first value, and wherein each negative comparison of a distinctive element of the reference code with the current code decrements the score by a second value;
    (h) making a decision (116) concerning the identity of the person from the result of the measurement; and
    (i) looping back to the placing step (106), with another predefined exterior limit (306), as long as there exist different predefined exterior limits (306) or as long as the decision taking step (116) is not positive.

8. The identification method (100) of claim 7, wherein the first value is equal to or greater than the second value.

9. The identification method (100) of claim 7, wherein the exterior limit (306) is predefined from elements exterior to the captured image.

10. The identification method (100) of claim 7, wherein each exterior limit (306) is a closed curve.

11. The identification method (100) of claim 10, wherein, when there are several closed curves (306), they define surfaces included in one another.

12. The identification method (100) of claim 7, wherein each exterior limit is predefined at the time of recording of the reference code.

13. A device (150) for identifying a person by his iris (252), the identification device (150) comprising:
- (a) a means (202) of capturing an image of an eye (250) to be identified;
- (b) a means (204) of determining an interior limit (304) of the iris (252) from the said image;
- (c) a means (206) of placing a predefined exterior limit (306) on said image;
- (d) a means of analysis (208) which, for the exterior limit (306), is designed to analyse the area (308) of the image lying between the interior limit (304) and the said exterior limit (306);
- (e) a means (210) of generating a current code associated with the said analysis;
- (f) a means (212) of comparing the current code with a previously generated reference code stored in a database (218);
- (g) a means (214) of measuring the resemblance between the current code and the reference code from the comparison, by incrementing a score by a first value, when the comparison of a distinctive element of the reference code with the current code is positive, and by decrementing the score by a second value, when the comparison of a distinctive element of the reference code with the current code is negative;
- (h) a means of making a decision (216) concerning the identity of the person from the result of the measurement; and
- (i) a means of looping back that is designed to choose another predefined exterior limit (306), as long as there exist different predefined exterior limits (306) or as long as the decision taking means (116) has not delivered a positive decision.

\* \* \* \* \*